United States Patent Office 3,674,424
Patented July 4, 1972

---

3,674,424
PROCESS FOR PURIFYING MOLYBDENITE CONCENTRATES
Robert W. Stanley, Pierrefonds, Quebec, Horace L. Ames, Port Credit, Ontario, and Peter H. Jennings, Pointe Claire, Quebec, Canada, assignors to Brenda Mines, Ltd., Peachland, British Columbia, Canada
No Drawing. Filed Oct. 3, 1969, Ser. No. 863,699
Claims priority, application Canada, May 13, 1969, 51,345
Int. Cl. C22b 59/00
U.S. Cl. 23—15 W                               9 Claims

ABSTRACT OF THE DISCLOSURE

Impurities are removed from molybdenite concentrates by leaching the concentrates at a temperature of at least 70° C. with an aqueous solution containing at least one alkali metal or alkaline earth metal chloride and at least one oxidising chloride selected from cupric and ferric chlorides.

---

The present invention relates to the leaching of molybdenite concentrates for the removal of impurities therefrom and in particular to such a leaching process for the selective removal of copper and lead from said concentrates.

Molybdenite ($MoS_2$) is the primary commercial source of molybdenum today. The mineral generally makes up less than 1% by weight of the ore or the flotation concentrate (e.g. copper concentrate) in which it occurs, and it is separated from the gangue or other minerals and recovered as a high grade molybdenite concentrate by flotation techniques. The molybdenite concentrate obtained by flotation techniques however often contains impurities including calcium, iron, and particularly copper and lead in the form inter alia, of sulphides thereof such as chalcopyrite ($CuFeS_2$) and galena (PbS). Copper and lead impurities are particularly objectionable and industrial requirements frequently call for a maximum concentration of 0.1% by weight or less as these elements.

Attempts have been made to purify molybdenite concentrates by removing, inter alia, copper and lead in a selective leaching process in which the concentrate is leached at about 85° C. under atmospheric pressure with an aqueous solution containing about 10% ferric chloride. This solution is adjusted to a pH of about 0.5 with hydrochloric acid. In the known prior art leaching process the ferric chloride is reduced to ferrous chloride and the liquor is recycled for further leaching of molybdenite concentrates after oxidation of the ferrous chloride back to ferric chloride using chlorine, removal of the lead as lead chloride by crystallization and adjustment of the pH of the liquor back to 0.5 by the addition of hydrochloric acid. However, while this prior art process is effective for removing lead, it has only a slow leaching effect on the copper in the molybdenite concentrate, particularly when the copper is in the form of chalcopyrite. Even after prolonged contact of the concentrate with the leach liquor the copper content of the concentrate still is too high for industrial requirements. While some improvement in the copper content can be achieved by raising the temperature of the leaching operation to 100° C., the improvement yet falls short of the desired result.

It has now been found that the addition of an alkali metal chloride or an alkaline earth metal chloride to a leach liquor containing an oxidizing metal chloride makes possible the attainment of standards of purity required by industry.

According to the present invention, therefore, there is provided in the treatment of a molybdenite concentrate for the removal of impurities therefrom a process comprising subjecting said concentrate to leaching at a temperature of at least 70° C. with an aqueous solution containing at least one alkali metal chloride or alkaline earth metal chloride in a concentration of at least 10% by weight of said solution and at least one oxidizing metal chloride. The use of alkali metal or alkaline earth metal chlorides results in solutions whose boiling points are substantially above 100° C., thus permitting the conduct of a leaching operation at a temperature of 110° C. or even higher without the application of pressure. In addition to the elevation of the boiling point, a further advantage of the use of alkali or alkaline earth metal chlorides is their ability to produce higher rates of copper extraction than solutions containing merely ferric chloride and hydrochloric acid.

The use of an alkaline earth metal chloride is preferred to the use of an alkali metal chloride since it has been found for example, that calcium and magnesium chlorides produce a greater elevation of boiling point of the leach liquor at atmospheric pressure than sodium and potassium chlorides of the same concentration, thus permitting leaching of the molybdenite concentrate to be effected at higher temperatures. Of the alkaline earth metal chlorides, calcium chloride is preferred to magnesium chloride as it is much less expensive, and when, for example, the magnesium chloride concentration of the leach liquor is lowered to a point at which its cost (per unit of solution) would be equal to that of the calcium chloride, the leaching effect is considerably reduced. The range of concentration in which the alkali metal chloride or alkaline earth metal chloride has been found to be effective is from about 10% by weight of the solution to the point of saturation of any particular chloride.

The oxidizing metal chloride is preferably cupric chloride or ferric chloride, and with these two oxidizing chlorides the reactions with the chalcopyrite in the molybdenite concentrate are believed to be as follows:

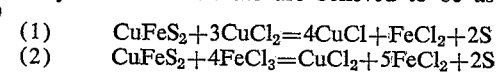

(1)     $CuFeS_2 + 3CuCl_2 = 4CuCl + FeCl_2 + 2S$
(2)     $CuFeS_2 + 4FeCl_3 = CuCl_2 + 5FeCl_2 + 2S$

The concentration of the oxidizing metal chloride should be sufficient to effect the desired extraction of copper from the molybdenite concentrate and should therefore be at least stoichiometrically sufficient to extract the copper from the concentrate in accordance with the above equations. As may be seen from the equations, it requires at least 10.2 parts by weight of ferric chloride or 6.35 parts by weight of cupric chloride to leach one part by weight of a copper from the chalcopyrite in the molybdenite concentrate. Although cupric chloride and ferric chloride may be used separately as the oxidizing metal chloride for the leaching of the copper, it has been found that there is a synergistic effect when a mixture of the two is used. When a mixture is used the weight ratio of ferric chloride to cupric chloride in the leaching solution preferably is higher. When cupric chloride is used alone or as the predominant component of a mixture as the oxidizing metal chloride in the leaching solution the required concentration of the cupric chloride is such that a very thorough washing of the molybdenite concentrate is necessary to remove the cupric chloride from the leached concentrate. It will be further seen from the above equations that when leaching with an aqueous solution containing ferric chloride as the oxidizing metal chloride copper is dissolved as cupric chloride from the molybdenite concentrate so that a certain proportion of cupric chloride in the leaching solution as oxidizing metal chloride may be readily obtained without any specific addition of cupric chloride to the solution. The leaching of the concentrate with the leach liquor results in the reduction of ferric chloride to ferrous chloride and of cupric chloride to cuprous chloride, and the leach liquor may be treated with chlorine subsequent to leaching of the molybdenite concentrate in order to oxidize the cuprous chloride and the ferrous chloride back to cupric chloride and ferric chloride. The regenerated solution may then be recycled for leaching of further molybdenite concentrate. It has been found that using a recycling leach solution as set forth above, results equaling those of individual leaches can be obtained. If the acidity of the solution is subject to a progressive change in a recycling leach as a result of neutralization of bases such as calcite, in the molybdenite concentrate, it may be necessary to add a quantity of hydrochloric acid to the solution before recycling for further leaching. Satisfactory results have been obtained by the addition of hydrochloric acid to the recycling solution resulting in a pH not exceeding 1.0 and preferably about zero. Further, in order to control the build-up in the recycling solution of the impurities such as lead, it is necessary to either discard a portion of the recycling leach solution or to strip the impurities from it. In fact the leach solution entrained in the filtered molybdenite concentrate will become diluted by wash water on subsequent washing of the molybdenite concentrate and is thus discarded necessitating the addition of new leach solution. This may constitute a sufficiently large fraction of the total leach solution to prevent excessive build-up of impurities.

It is found that besides copper and lead by the method of the present invention substantial amounts of calcium, bismuth and iron are also leached from the molybdenite concentrates and a considerable improvement in the grade of the concentrate is attained by the removal of these impurities. Further, the fraction of the molybdenum entering the leach solution from the molybdenite concentrate is very small rarely exceeding a few tenths of one percent.

Molybdenite concentrates that contains, for example, calcite in substantial amounts evolve carbon dioxide on first being contacted with the leach solution and if the concentrate is added too rapidly to the leach solution foaming occurs which causes inconvenience. As such, defoaming agents may be added to destroy the foam, but by allowing adequate time for the mixing of the molybdenite concentrate and the leach solution, the addition of the defoamer is generally unnecessary.

The temperature at which the leaching of the molybdenite concentrate takes place must be at least 70° C., as below this temperature the leaching of the molybdenite concentrate is too slow for the process to be economic. Reference is made to Table VI in this connection. The maximum temperature permissible is the boiling point of the leach liquor at atmospheric pressure which as aforesaid is substantially above 100° C. To achieve the full benefits of the present invention, temperatures between 100° C. and the boiling point of the leach liquor at atmospheric pressure are desirable.

It has been found that a leach solution containing about 10% ferric chloride and about 30% calcium chloride used at a temperature of about 110° C. enables a typical by-product molybdenite concentrate containing about 0.5% copper and 0.5% lead to be leached in about two hours when there is a cupric chloride concentration of about 1% in the solution obtained either directly by addition or indirectly by natural build-up in recycled solutions in accordance with Equation 2 above. If the solution does not contain cupric chloride, a slightly longer leach time is required. The leaching rate is dependent upon a number of factors including particle size of the molybdenite concentrate, distribution of the impurities in the concentrate and other factors specific to the particular molybdenite concentrate, but it is within the skill of the art to take such factors into account in determining suitable concentrations in the leaching solution and suitable leaching times. Agitation of the liquor and the molybdenite concentrate during the leaching operation need not be greater than is necessary to maintain a uniform suspension of the concentrate in the solution.

The present invention will be further illustrated by way of the following examples:

EXAMPLE 1

In a series of eight separate leach processes a separate portion of a finely divided molybdenite concentrate of particle size such that 58% passed through a 325 mesh (Tyler) screen was leached at 30% solids with an aqueous leach solution containing a constant amount of calcium chloride and either cupric chloride, ferric chloride, or both. Leaching was effected at 110° C. under atmospheric pressure. In leach process No. 5 3% of 37% hydrochloric acid was added at the start and a further 2% of this acid after 2 hours. The results obtained are given in Table I below:

TABLE I

| Leach process No. | Solution composition, percent | | | Temp., °C. | Analysis of solids, percent, in leached molybdenite concentrate at times stated (hr.) | | | | | | | | | | | | | | | | |
|---|---|---|---|---|---|---|---|---|---|---|---|---|---|---|---|---|---|---|---|---|
| | | | | | Copper | | | | | | Lead | | | | | | Iron | | | | |
| | CuCl$_2$ | FeCl$_3$ | CaCl$_2$ | | 0 | ¼ | ½ | 1 | 2 | 3 | 0 | ¼ | ½ | 1 | 2 | 3 | 0 | ¼ | ½ | 1 | 2 | 3 |
| 1 | 5 | | 30 | 110 | .54 | .30 | .24 | .17 | .13 | .10 | .55 | .11 | .12 | .10 | .05 | .04 | .91 | .60 | .49 | .40 | .30 | .28 |
| 2 | 5 | | 30 | 110 | .54 | .32 | .28 | .20 | .15 | .11 | .55 | .13 | .13 | .12 | .08 | .06 | .91 | .68 | .61 | .53 | .39 | .35 |
| 3 | 10 | | 30 | 110 | .54 | .36 | .24 | .14 | .09 | .10 | .55 | .11 | .06 | .04 | .03 | .03 | .91 | .73 | .60 | .51 | .42 | .33 |
| 4 | 10 | | 30 | 110 | .54 | .32 | .21 | .14 | .11 | .08 | .55 | .09 | .06 | .04 | .03 | .03 | .91 | .68 | .60 | .47 | .40 | .36 |
| 5 | 5 | | 30 | 110 | .54 | .34 | .26 | .18 | .12 | .09 | .55 | .05 | .03 | .02 | .01 | .01 | .91 | .45 | .37 | .29 | .25 | .22 |
| 6 | | 10 | 30 | 110 | .54 | | | .14 | .09 | .06 | .55 | | | .02 | .02 | .02 | .91 | | | .47 | .46 | .44 |
| 7 | 1 | 10 | 30 | 110 | .54 | .27 | .18 | .09 | .05 | .04 | .55 | .02 | .02 | .02 | .02 | .02 | .91 | .67 | .55 | .45 | .40 | .38 |
| 8 | 2 | 10 | 30 | 110 | .54 | .28 | .21 | .12 | .04 | .07 | .55 | .03 | .02 | .02 | .01 | .02 | .91 | .53 | .49 | .40 | .31 | .35 |

It will be seen from Table I that the percentages of copper, lead and iron in the molybdenite concentrate are reduced in a matter of two to three hours to desirable low values and that in the leach processes the best results were obtained with a mixture of cupric and ferric chlorides in the leach solution.

EXAMPLE 2

In a series of six separate leach processes molybdenite concentrates were leached with an aqueous solution containing cupric chloride and ferric chloride in various proportions as well as alkali metal or alkaline earth metal chlorides for a comparison of the effect of these latter chlorides in the process. For the first four leach processes the temperature of leaching was 110° C. and the molybdenite concentrate was as in Example I. In leach processes 5 and 6 the leach temperature was 100° C., the molybdenite concentrate was a composite concentrate of particle size such that 63% thereof passed through a 325 mesh (Tyler) screen. In the first four leach processes the leaching was done at 30% solids whilst in the last two, leaching was done at 35% solids. The results obtained are given in Table II below:

the concentrate was as in Example 1. In leach processes 8 and 10, leaching was done at 30% solids and in the remainder at 35% solids. The results are given in Table III below:

TABLE II

Analysis of solids, percent, in leached molybdenite concentrate at times stated (hr.)

| Leach process No. | Solution composition, percent | | | | | | Temp., °C. | Copper | | | | | | | Lead | | | | | | | Iron | | | | | | |
|---|---|---|---|---|---|---|---|---|---|---|---|---|---|---|---|---|---|---|---|---|---|---|---|---|---|---|---|---|
| | CuCl₂ | FeCl₃ | CaCl₂ | MgCl₂ | KCl | NaCl | | 0 | ½ | 1 | 2 | 3 | | | 0 | ½ | 1 | 2 | 3 | | | 0 | ½ | 1 | 2 | 3 | | |
| 1 | 1 | 5 | | | | | 110 | .54 | .34 | .28 | .22 | .17 | | | .55 | .02 | .02 | .02 | .02 | | | .91 | .76 | .69 | .63 | .53 | | |
| 2 | 1 | 10 | | | | | 110 | .54 | .09 | .07 | .04 | .04 | | | .55 | .02 | .02 | .02 | .01 | | | .91 | .62 | .54 | .52 | .51 | | |
| 3 | 1 | 5 | 30 | | | | 110 | .54 | .25 | .10 | .05 | .07 | | | .55 | .03 | .01 | .01 | .01 | | | .91 | .62 | .59 | .52 | .46 | | |
| 4 | 1 | 10 | 30 | | | | 110 | .54 | .18 | .09 | .05 | .04 | | | .55 | .08 | .01 | .01 | .03 | | | .91 | .55 | .45 | .40 | .38 | | |
| 5 | 1 | 10 | | 8 | | | 100 | .45 | | .08 | .06 | | | | .22 | | .03 | .03 | | | | .99 | | .72 | .61 | .53 | | |
| 6 | 1 | 10 | | | | 20 | 100 | .45 | | .20 | .12 | .03 | | | .22 | | .02 | .02 | .02 | | | .99 | | .58 | .58 | .60 | | |

It will be seen from Table II that the percentages of copper, lead and iron in the molybdenite concentrate are reduced in a matter of 2 to 3 hours to desirable low values and that the leach processes using the alkaline earth metal chlorides are superior to those using the alkali metal chlorides.

EXAMPLE 3

In a series of 10 leach processes molybdenite concentrates were leached with an aqueous solution containing various proportions of calcium chloride, ferric chloride and cupric chloride at temperatures varying from 105° C. to 110° C. to illustrate the effect of the composition of the leach solution in the effectiveness of the process. In leach processes 1 to 7 the concentrate was the composite concentrate of Example 2, and in leach processes 8 to 10

TABLE III

Analysis of Solids, percent, in leached molybdenite concentrate at times stated (hr.)

| Leach process No. | Solution composition percent | | | Temp., °C. | Copper | | | | | Lead | | | | | Iron | | | | | Calcium | | | | | Molybdenum | | | | | Bismuth | | | | |
|---|---|---|---|---|---|---|---|---|---|---|---|---|---|---|---|---|---|---|---|---|---|---|---|---|---|---|---|---|---|---|---|---|---|---|
| | CuCl₂ | FeCl₃ | CaCl₂ | | 0 | 1 | 1½ | 2 | 3 | 0 | 1 | 1½ | 2 | 3 | 0 | 1 | 1½ | 2 | 3 | 0 | 1 | 1½ | 2 | 3 | 0 | 1 | 1½ | 2 | 3 | 0 | 1 | 1½ | 2 | 3 |
| 1 | 1 | 10 | 30 | 110 | .45 | .15 | .12 | | | .22 | .03 | | | | .22 | .48 | .46 | .44 | .42 | .09 | .19 | .18 | .30 | .08 | 51.8 | 55.3 | 53.7 | 55.2 | 56.3 | | | | | |
| 2 | 1 | 10 | 30 | 110 | .45 | .09 | .08 | .06 | .04 | .22 | .02 | .03 | .02 | .01 | .22 | .46 | .50 | .42 | .42 | .06 | .33 | .29 | .28 | .40 | 51.8 | 53.1 | 52.6 | 53.7 | 53.5 | | | | | |
| 3 | 1 | 9 | 30 | 105 | .45 | .13 | .10 | .08 | .05 | .22 | .01 | .01 | .01 | .01 | .22 | .46 | .56 | .45 | .46 | .08 | .33 | .29 | .20 | .28 | 51.8 | 53.7 | 53.3 | 53.8 | 53.4 | | | | | |
| 4 | 1 | 8 | 24 | 105 | .45 | .12 | .13 | .08 | .05 | .22 | .01 | .01 | .01 | .03 | .22 | .55 | .53 | .51 | .46 | .08 | .53 | .21 | .24 | .24 | 51.8 | 53.7 | 53.3 | 53.9 | 54.4 | | | | | |
| 5 | 1 | 10 | 20 | 105 | .45 | .12 | .10 | .08 | .11 | .22 | .02 | .02 | .02 | .02 | .22 | .57 | .53 | .51 | .46 | .14 | .53 | .21 | .20 | | 51.8 | 53.4 | 53.3 | 53.9 | 53.9 | | | | | |
| 6 | 1 | 10 | 10 | 105 | .45 | .16 | .17 | .14 | .08 | .22 | .02 | .02 | .02 | .02 | .22 | .60 | .57 | .52 | .46 | .10 | | | | | 51.8 | 54.0 | 54.3 | 54.2 | 54.4 | | | | | |
| 7 | 1 | 10 | 5 | 110 | .54 | .33 | .29 | .19 | .13 | .55 | .02 | .02 | .03 | .02 | .55 | .54 | .57 | .47 | .50 | .19 | | | | | 51.8 | 54.0 | 54.3 | 54.8 | 54.4 | | | | | |
| 8 | 1 | | 30 | 110 | .54 | .14 | .12 | .10 | .06 | .55 | .03 | .02 | .02 | .02 | .55 | .66 | .61 | .47 | .44 | .55 | | | | | 52.1 | 55.4 | 56.1 | | | | | | | |
| 9 | 1 | | 30 | 110 | .54 | .09 | .07 | .05 | .04 | .55 | .03 | .02 | .02 | .02 | .55 | .47 | .47 | .46 | .38 | .55 | .37 | .05 | .32 | .37 | | | | | | | | | | |
| 10 | | 1 | 30 | 110 | .54 | .09 | .07 | .05 | .04 | .55 | | .02 | .02 | .02 | .55 | .45 | .42 | .40 | .38 | | | .18 | | | | | | | | | | | | |

It will be seen from Table III that the percentages of copper, lead, iron, calcium and bismuth in the molybdenite concentrate are reduced in a matter of 2 to 3 hours or less to desirable low values, that the processes using a mixture of cupric and ferric chlorides give best results, and that a calcium chloride concentration of as little as 10% is sufficient for the process.

EXAMPLE 4

In a series of 10 leach processes the composite molybdenite concentrate of Example 2 was leached at 110° C. (except in process 4 which was at 105° C.) in a 1 gallon glass lined reactor at 35% solids with an aqueous solution containing 1% cupric chloride, 10% ferric chloride, and 30% calcium chloride with different speeds of agitation. The results are given in Table IV below:

TABLE IV

| Leach process No. | Agitator speed, r.p.m. | Heads | Copper (percent) in leached molybdenite concentrate at times stated (hr.) | | | | | |
|---|---|---|---|---|---|---|---|---|
| | | | 0 (after heat-up) | 0.5 | 1 | 1.5 | 2 | 3 | 4 | 5 |
| 1 | 200 | .45 | .22 | .12 | .10 | .08 | .07 | .05 | | | |
| 2 | 300 | .45 | | | .11 | .07 | .06 | .05 | .04 | | |
| 3 | 300 | .45 | | | .08 | .07 | .05 | .04 | | | |
| 4 | 300 | .45 | .21 | | .16 | .12 | .10 | .06 | .05 | .04 | .04 |
| 5 | 300 | .45 | .25 | | .05 | .03 | .03 | .02 | .01 | .01 | .01 |
| 6 | 300 | .45 | | | .10 | .07 | .06 | .04 | .04 | | |
| 7 | 330 | .45 | | | .11 | .07 | .05 | .05 | .03 | .02 | .02 |
| 8 | 411 | .45 | .23 | .12 | .11 | .07 | .07 | .05 | .04 | .03 | |
| 9 | 580 | .45 | .20 | .11 | .07 | .05 | .06 | .04 | .03 | | |
| 10 | 700 | .45 | | | | | | | | | |

It will be seen from Table IV that the speed agitation is not an important factor in the leaching processes and that the percentage of copper is reduced to desirable values in the concentrate within about 2 hours.

EXAMPLE 5

In a cyclic process an aqueous leach solution containing 1% cupric chloride, 30% calcium chloride and 10% ferric chloride was used to leach 30 molybdenite concentrates for the removal of copper and lead therefrom. The leaching time per cycle was two hours; hydrochloric acid was used to adjust the pH of the regenerated solution to about zero, regeneration of the solution was with chlorine and a proportion of the regenerated solution was bled off to remove impurities. The results are given in Table V below:

tion of at least one oxidizing metal chloride, such as ferric chloride or cupric chloride, acidified to a pH

TABLE V

| Cycle No. | Analysis of solids, percent | | | | Percent passing 32.5 mesh | HCl used to adjust solution pH to 0 before leaching lb. 22° Bé., HCl per ton concentrate | pH of solution after leaching | Analysis of solution after leaching, g.pl. | | | Solution bleed, percent | Chloride required to regenerate recycled solution, lb. per ton concentrate |
|---|---|---|---|---|---|---|---|---|---|---|---|---|
| | Copper | | Lead | | | | | Cu | Pb | Mo | | |
| | Heads | 2 hr. | Heads | 2 hr. | | | | | | | | |
| 1 | .28 | .06 | .20 | .01 | 50 | 1 | 0.25 | 7.4 | 1.14 | 0.14 | | 29 |
| 2 | .24 | .06 | .08 | .01 | 87 | 1 | <0 | | | | | 28 |
| 3 | .20 | .02 | .06 | .01 | 80 | 0 | <0 | 8.2 | 1.54 | 1.25 | | 21 |
| 4 | .28 | .06 | .20 | .02 | 50 | 0 | 0.25 | 7.7 | 2.10 | 0.46 | | 25 |
| 5 | .24 | .04 | .08 | .02 | 87 | 2 | <0 | 7.9 | 2.18 | 0.94 | | 25 |
| 6 | .20 | .01 | .06 | .01 | 80 | 0 | <0 | 7.5 | 2.04 | 1.08 | | 21 |
| 7 | 1.00 | .06 | .17 | .01 | 43 | 0 | 0.5 | 12.3 | 2.64 | 0.64 | ¹20.6 | 52 |
| 8 | .28 | .05 | .20 | .01 | 50 | 4 | 0.6 | 10.4 | 2.92 | 0.26 | | 20 |
| 9 | .24 | .04 | .08 | .02 | 87 | 5 | <0 | 12.1 | 3.20 | 0.87 | | 37 |
| 10 | 1.00 | .07 | .17 | .01 | 43 | 0 | 0.4 | 17.3 | 3.74 | 0.83 | | 68 |
| 11 | .28 | .04 | .20 | .01 | 50 | 5 | 0.3 | 17.9 | 4.88 | 0.47 | | 34 |
| 12 | .24 | .03 | .08 | .02 | 87 | 5 | <0 | 14.2 | 3.80 | 1.03 | | 33 |
| 13 | 1.00 | .06 | .17 | .01 | 43 | 0 | 0.4 | 18.7 | 4.16 | 0.82 | | 61 |
| 14 | .54 | .05 | .55 | .01 | 58 | 5 | <0 | 17.9 | 7.48 | 1.51 | | 78 |
| 15 | .35 | .01 | .11 | .02 | 76 | 0 | <0 | 14.8 | 6.46 | 3.5 | | 39 |
| 16 | 1.00 | .05 | .17 | .02 | 43 | 0 | 0.0 | 20.7 | 6.46 | 3.0 | | 63 |
| 17 | .54 | .05 | .55 | .03 | 58 | 0 | <0 | 18.8 | 9.34 | 3.1 | | 49 |
| 18 | .35 | .01 | .11 | .02 | 76 | 0 | <0 | 19.0 | 9.08 | 5.1 | | 34 |
| 19 | .57 | .02 | .11 | .02 | 79 | 0 | 0.0 | 17.6 | 7.30 | 2.4 | ¹18.3 | 51 |
| 20 | .57 | .01 | .11 | .02 | 79 | 0 | 0.35 | 21.2 | 7.40 | 1.0 | | 55 |
| 21 | .57 | .02 | .11 | .02 | 79 | 5 | 0.25 | 17.0 | 5.30 | 1.0 | | 59 |
| 22 | .57 | .02 | .11 | .03 | 79 | 5 | 0.25 | 18.1 | 4.90 | 1.2 | | 43 |
| 23 | .57 | .02 | .11 | .03 | 79 | 5 | 0.10 | 16.6 | 4.28 | 1.2 | | 42 |
| 24 | .57 | .02 | .11 | .03 | 79 | 2 | 0.35 | 18.7 | 4.41 | 1.2 | | 43 |
| 25 | .35 | .04 | .12 | .02 | 80 | 5 | 0.55 | 14.6 | 2.30 | 1.11 | 31.5 | 98 |
| 26 | .35 | .05 | .12 | .02 | 80 | 10 | <0 | 12.2 | 1.82 | 1.08 | 31.9 | 41 |
| 27 | .35 | .05 | .12 | .02 | 80 | 0 | 0.20 | 11.4 | 1.74 | 1.17 | 31.9 | 51 |
| 28 | .35 | .05 | .12 | .02 | 80 | 6 | <0 | 8.8 | 1.50 | 1.12 | 31.9 | 33 |
| 29 | .35 | .04 | .12 | .02 | 80 | 0 | <0 | 9.1 | 1.52 | 1.22 | 31.9 | 41 |
| 30 | .35 | .05 | .12 | .03 | 80 | 0 | | 8.8 | 1.40 | 1.16 | | 29 |

¹ Average.

It will be seen from Table V that the results of the cyclic leaching with the same leaching solution equals those of individual leaches and the percentages of copper and lead in the leached molybdenite concentrate can be reduced to desirable low values in a period of 2 hours. Furthermore, only small amounts of molybdenum are dissolved.

EXAMPLE 6

While the process of the invention may be carried out satisfactorily at temperatures as low as 70° C. it is preferred to carry out the process at temperatures above 100° C. The effect of temperature is illustrated by the results summarized in Table VI which relate to the leaching of a molybdenite concentrate of a particle size such that 80% passed a 325 mesh (Tyler) screen with a leach solution containing 1% cupric chloride, 10% ferric chloride and 30% calcium chloride.

of at most about 1 and preferably of at most about 0.5 with hydrochloric acid, at a pressure greater than atmospheric and at a temperature greater than 100° C. but below the boiling point of the leaching solution. By operating under pressure in accordance with this aspect of the invention it is possible to raise the leaching temperature to as high as 110° C. or 120° C. and thereby to increase the rate of the leaching processes and the degree of leaching of the undesirable impurities.

This aspect of the invention may be illustrated by reference to the following example.

EXAMPLE 7

Leaching of the composite molybdenite concentrate described in Example 2 was carried out using a leach solution containing only oxidizing metal chlorides and hydrochloric acid at various temperatures. In the case of leaching experiments carried out above 100° C. sufficient pressure was applied to prevent the leaching mixture from boiling. The results obtained are given in Table VII following:

TABLE VI

| Leach process No. | Temp., °C. | Analysis of solids, percent, at times stated (hr.) | | | | | | | | | | | | | | |
|---|---|---|---|---|---|---|---|---|---|---|---|---|---|---|---|---|
| | | Copper | | | | Lead | | | | Iron | | | | Calcium | | | |
| | | 0 | 1 | 2 | 4 | 0 | 1 | 2 | 4 | 0 | 1 | 2 | 4 | 0 | 1 | 2 | 4 |
| 153 | 70 | .20 | .16 | .15 | .13 | .06 | .03 | .03 | .03 | .57 | .53 | .51 | .50 | .52 | .17 | .06 | .20 |
| 154 | 80 | .20 | .14 | .11 | .09 | .06 | .03 | .03 | .03 | .57 | .46 | .39 | .36 | .52 | .03 | .15 | .08 |
| 155 | 90 | .20 | .10 | .07 | .05 | .06 | .02 | .02 | .02 | .57 | .36 | .31 | .31 | .52 | .08 | .09 | .17 |
| 156 | 100 | .20 | .08 | .06 | .03 | .06 | .03 | .03 | .02 | .57 | .44 | .30 | .26 | .52 | .08 | .05 | .04 |
| 97 | 110 | .20 | | .01 | | .06 | | .01 | | .57 | | .32 | | .52 | | .13 | |

In another aspect of the invention it has been found that it is possible to effect a satisfactory leaching of molybdenite concentrates by a process which comprises subjecting the concentrate to leaching with an aqueous solu-

TABLE VII

| Leach process No. | Temperature, °C | Solution composition, percent | | | | Analysis of solids, percent, at times stated (hr.) | | | | | | | |
|---|---|---|---|---|---|---|---|---|---|---|---|---|---|
| | | CuCl₂ | FeCl₃ | HCl (37%) | pH | Copper | | | | Lead | | | |
| | | | | | | 0 | 1 | 2 | 3 | 0 | 1 | 2 | 3 |
| 1 | 100 | 0 | 10 | ------ | 0.5 | .45 | .28 | .24 | .22 | .22 | .01 | .01 | .01 |
| 2 | 100 | 1 | 10 | 3.8 | ------ | .45 | .25 | .21 | .16 | .22 | .02 | .01 | .02 |
| 3 | 100 | 1 | 10 | 7.6 | ------ | .45 | .30 | .17 | .21 | .22 | .02 | .01 | .01 |
| 4 | 110 | 1 | 10 | 3.8 | ------ | .45 | ------ | .11 | ------ | .22 | ------ | .02 | ------ |
| 5 | 120 | 0 | 10 | 3.8 | ------ | .45 | ------ | .06 | ------ | .22 | ------ | .02 | ------ |

It will be seen from Table VII that the use of hyperatmospheric pressures and temperatures greater than 100° C. makes possible leaching processes in which the final concentrations of the undesirable impurities are reduced very significantly without the use of alkali or alkaline earth metal chlorides.

We claim:

1. In the treatment of a molybdenite concentrate for the removal of impurities from the group copper, lead, calcium, bismuth and iron therefrom, a process comprising subjecting said concentrate to leaching with an aqueous solution containing at least one alkali metal chloride or alkaline earth metal chloride selected from the group consisting of sodium chloride, potassium chloride, magnesium chloride and calcium chloride in a concentration of at least 10% by weight of said solution and at least one oxidizing metal chloride selected from the group consisting of cupric chloride and ferric chloride at a temperature of from about 70° C. up to the boiling point of the solution, said leaching effecting dissolution of a substantial proportion of said impurities without dissolving an appreciable proportion of the molybdenum.

2. A process as claimed in claim 1 in which the oxidizing metal chloride is a mixture of cupric chloride and ferric chloride.

3. A process as claimed in claim 1, in which the alkaline earth metal chloride is calcium chloride.

4. A process as claimed in claim 1, in which the temperature is between 100° C. and the boiling point of the leaching solution at atmospheric pressure.

5. A process as claimed in claim 1 in which the leaching solution comprises about 1% of cupric chloride, about 10% of ferric chloride and about 20 to 30% of calcium chloride, and the leaching operation is effected at a temperature of from 100° C. to the boiling point of the solution at atmospheric pressure.

6. A process as claimed in claim 1 in which the concentration of the oxidizing metal chloride is at least stoichiometrically sufficient to oxidise copper impurity present as chalcopyrite in the concentrate.

7. In the treatment of a molybdenite concentrate for the removal of impurities from the group copper, calcium, bismuth and iron therefrom, a process comprising subjecting said concentrate to leaching with an aqueous solution of at least one oxidizing metal chloride selected from the group consisting of cupric chloride and ferric chloride, said solution being acidified with hydrochloric acid to a pH of about 1 or lower, said leaching being conducted at a pressure greater than atmospheric and at a temperature in the range of from the boiling point of the solution at atmospheric pressure to about 120° C., said leaching effecting dissolution of a substantial proportion of said impurities without dissolving an appreciable proportion of the molybdenum.

8. A process as claimed in claim 7 which the oxidizing metal chloride is a mixture of cupric chloride and ferric chloride.

9. A process as claimed in claim 7 in which the leaching temperature is at least 110° C.

References Cited
UNITED STATES PATENTS

| 1,281,961 | 10/1918 | Holladay | 23—15 W |
| 2,096,846 | 10/1937 | Donahue et al. | 23—15 W |
| 2,238,250 | 4/1941 | Curtis | 23—15 W |
| 2,829,964 | 4/1958 | Zimmerley et al. | 23—15 W |

HERBERT T. CARTER, Primary Examiner

U.S. Cl. X.R.

23—18, 19, 134, 87 R, 97, 224